US010356461B2

(12) United States Patent
Massoudi

(10) Patent No.: US 10,356,461 B2
(45) Date of Patent: Jul. 16, 2019

(54) ADAPTIVE MULTI-DEVICE CONTENT GENERATION BASED ON ASSOCIATED INTERNET PROTOCOL ADDRESSING

(71) Applicant: adRise, Inc., San Francisco, CA (US)

(72) Inventor: Farhad Massoudi, San Francisco, CA (US)

(73) Assignee: ADRISE, INC., San Francisco, CA (US)

( * ) Notice: Subject to any disclaimer, the term of this patent is extended or adjusted under 35 U.S.C. 154(b) by 0 days.

(21) Appl. No.: 14/846,277

(22) Filed: Sep. 4, 2015

(65) Prior Publication Data

US 2017/0070764 A1 Mar. 9, 2017

Related U.S. Application Data

(63) Continuation of application No. 14/056,897, filed on Oct. 17, 2013, now abandoned.

(Continued)

(51) Int. Cl.

| | |
|---|---|
| ***H04N 21/2668*** | (2011.01) |
| ***H04L 29/06*** | (2006.01) |
| ***H04L 12/721*** | (2013.01) |
| ***H04L 29/08*** | (2006.01) |
| ***H04N 21/81*** | (2011.01) |
| ***H04N 21/258*** | (2011.01) |
| ***H04N 21/61*** | (2011.01) |
| ***H04N 21/426*** | (2011.01) |
| ***H04L 12/741*** | (2013.01) |

(Continued)

(52) U.S. Cl.

CPC ......... *H04N 21/2668* (2013.01); *H04L 45/72* (2013.01); *H04L 45/74* (2013.01); *H04L 65/60* (2013.01); *H04L 67/306* (2013.01); *H04N 21/25841* (2013.01); *H04N 21/25891* (2013.01); *H04N 21/42684* (2013.01); *H04N 21/6125* (2013.01); *H04N 21/812* (2013.01); *H04L 41/50* (2013.01); *H04L 41/5048* (2013.01); *H04L 61/2007* (2013.01); *H04N 21/4782* (2013.01)

(58) Field of Classification Search

CPC ......... H04N 21/2668; H04N 21/25841; H04N 21/42684; H04N 21/6125; H04N 21/812

USPC ........................ 725/32–36; 705/16.64, 14.23

See application file for complete search history.

(56) References Cited

U.S. PATENT DOCUMENTS 8,776,111 B1 7/2014 Eldering et al.
9,215,123 B1 12/2015 Fears et al.

(Continued)

*Primary Examiner* — Joshua D Taylor

(74) *Attorney, Agent, or Firm* — Redbrick IP, P.C.

(57) ABSTRACT

A system for adaptive multi-device content distribution based on associated internet protocol (IP) addressing, the system including: a computer processor; a content engine executing on the computer processor and configured to: identify media content served to a television client; identify a client internet protocol (IP) address associated with the television client; submit, to a content exchange service, a request for content placement opportunities; receive content placement opportunities from the content exchange service, each content placement opportunity identifying at least a portion of a source IP address; identify, based on the provided portion of the source IP address, a subset of the content placement opportunities associated with the client IP address; and a content provider configured to: identify content relevant to the media content; and provide the content for the subset of the content placement opportunities.

16 Claims, 9 Drawing Sheets

Related U.S. Application Data

(60) Provisional application No. 61/800,348, filed on Mar. 15, 2013.

(51) Int. Cl.

| | |
|---|---|
| *H04L 29/12* | (2006.01) |
| *H04L 12/24* | (2006.01) |
| *H04N 21/4782* | (2011.01) |

(56) References Cited

U.S. PATENT DOCUMENTS

| | | | | |
|---|---|---|---|---|
| 9,465,604 | B1 | 10/2016 | Burgyan et al. | |
| 9,563,928 | B1 | 2/2017 | Sokolowski et al. | |
| 2002/0178126 | A1 | 11/2002 | Beck et al. | |
| 2003/0235184 | A1* | 12/2003 | Dorenbosch | H04L 29/06 370/352 |
| 2006/0075019 | A1 | 4/2006 | Donovan | |
| 2006/0253323 | A1 | 11/2006 | Phan | |
| 2007/0233671 | A1 | 10/2007 | Oztekin et al. | |
| 2008/0082604 | A1 | 4/2008 | Mansour et al. | |
| 2008/0259906 | A1* | 10/2008 | Shkedi | G06Q 30/0241 370/352 |
| 2009/0006214 | A1 | 1/2009 | Lerman | |
| 2009/0089161 | A1 | 4/2009 | Ali | |
| 2009/0106785 | A1 | 4/2009 | Pharn | |
| 2009/0129479 | A1 | 5/2009 | Yellamraju | |
| 2009/0204478 | A1 | 8/2009 | Kaib et al. | |
| 2010/0211967 | A1* | 8/2010 | Ramaswamy | H04H 20/14 725/14 |
| 2011/0093335 | A1* | 4/2011 | Fordyce, III | G06Q 20/40 705/14.53 |
| 2011/0113116 | A1* | 5/2011 | Burdette | H04L 29/12792 709/217 |
| 2011/0125594 | A1 | 5/2011 | Brown et al. | |
| 2011/0167440 | A1 | 7/2011 | Greenfield | |
| 2011/0246298 | A1 | 10/2011 | Williams et al. | |
| 2011/0252305 | A1 | 10/2011 | Tschani et al. | |
| 2011/0258049 | A1* | 10/2011 | Ramer | G06F 17/30867 705/14.66 |
| 2012/0016655 | A1 | 1/2012 | Travieso et al. | |
| 2012/0089455 | A1 | 4/2012 | Belani et al. | |
| 2012/0102169 | A1 | 4/2012 | Yu | |
| 2012/0151079 | A1* | 6/2012 | Besehanic | H04H 60/74 709/231 |
| 2013/0268951 | A1 | 10/2013 | Wyatt et al. | |
| 2013/0346202 | A1 | 12/2013 | Kouladjie et al. | |
| 2014/0075014 | A1* | 3/2014 | Chourey | G06Q 30/02 709/224 |
| 2014/0101739 | A1 | 4/2014 | Li et al. | |
| 2014/0143052 | A1 | 5/2014 | Stryker et al. | |
| 2014/0181243 | A1 | 6/2014 | Nieuwenhuys et al. | |
| 2014/0282642 | A1 | 9/2014 | Needham et al. | |
| 2014/0372415 | A1 | 12/2014 | Fernandez-Ruiz et al. | |
| 2014/0379911 | A1 | 12/2014 | Fayssal et al. | |
| 2015/0206198 | A1 | 7/2015 | Marshall | |
| 2015/0234564 | A1 | 8/2015 | Snibbe et al. | |
| 2015/0271540 | A1 | 9/2015 | Melby et al. | |
| 2015/0382075 | A1 | 12/2015 | Neumeier et al. | |
| 2016/0358209 | A1 | 12/2016 | Khozani et al. | |
| 2016/0360289 | A1 | 12/2016 | Santoro et al. | |
| 2017/0064411 | A1 | 3/2017 | Goli et al. | |

* cited by examiner

305

310

Figure 3E
SLS AMG GT
starting at $199,500*
Seating
Acceleration
Top speed
OK

ADAPTIVE MULTI-DEVICE CONTENT GENERATION BASED ON ASSOCIATED INTERNET PROTOCOL ADDRESSING

CROSS-REFERENCE TO RELATED APPLICATION

This application is a continuation of co-pending U.S. application Ser. No. 14/056,897, filed on Oct. 17, 2013 and entitle "INTERACTIVE ADVERTISING," which claims benefit of U.S. Provisional Patent Application No. 61/800,348, filed on Mar. 15, 2013 and entitled "CONNECTED-TV ADVERTISING, INTERACTIVE VIDEO ADVERTISING, IMAGE-BASED INTERACTIVE ADVERTISING, SECOND SCREEN ADVERTISING, HOUSEHOLD TARGETING, AND PERSONALIZED TV ADVERTISEMENTS." U.S. patent application Ser. No. 14/056,897 and U.S. Provisional Patent Application No. 61/800,348 are incorporated by reference herein, in their entirety.

BACKGROUND

Recent advancements in computing technology have led to a movement for creating internet-connected devices. Inexpensive hardware has contributed to a trend in which traditionally non-connected devices (e.g., televisions, radios, etc.) now include network connectivity. This has also lead to significant technical challenges in the development of client software and services necessary to support these devices.

As the number and type of network-connected computing devices has increased, there has been a fragmentation of content availability and quality among the various platforms. Even the same application can have an entirely different user experience when ported or developed for multiple different platforms and device form factors.

A model for providing content to connected devices involves serving content to a native client application executing on the connected device. Companies wishing to have a presence on such devices are required to invest significant resources in development and support for native applications across a variety of different platforms. Complicating matters, some devices lack the execution environment and rendering functionality required by traditional native applications. These devices are strictly limited in the number and type of applications that they support. As a result of these limitations, many of these devices have limited or no built-in content-providing functionality.

SUMMARY

Embodiments provide technical solutions to the aforementioned and other technical problems. For example, one or more embodiments allow platform-independent content distribution to "thin" client applications executing on various client devices and across a variety of different platforms. As a result, for example, resource-intensive operations (e.g., video encoding or webpage rendering) may be avoided on devices that lack the execution environment and rendering functionality required by traditional native applications. Further, developers can substantially avoid the difficult, costly, and near impossible task of developing platform-specific applications. In another example, one or more embodiments provide interactive user interfaces that may be controlled, manipulated, or navigated by a thin client application executing on a client device. A server may provide an instruction set defining client-interactive controls and identifying a set of images (optionally rendered by the server) to a thin client application. The instruction set may be used to provide a user interface. A user engagement request from a thin client application may include a command for navigating from a current page to a previous page, thereby providing a web browser-like experience on devices that lack the execution environment and rendering functionality required by traditional native applications. In yet another example, one or more embodiments allow targeting or retargeting of content to client devices based on metadata related to internet protocol (IP) addressing.

In general, in one aspect, embodiments relate to a system for adaptive multi-device content distribution based on associated internet protocol (IP) addressing, the system including: a computer processor; a content engine executing on the computer processor and configured to: identify media content served to a television client; identify a client internet protocol (IP) address associated with the television client; submit, to a content exchange service, a request for content placement opportunities; receive content placement opportunities from the content exchange service, each content placement opportunity identifying at least a portion of a source IP address; identify, based on the provided portion of the source IP address, a subset of the content placement opportunities associated with the client IP address; and a content provider configured to: identify content relevant to the media content; and provide the content for the subset of the content placement opportunities.

In general, in one aspect, embodiments relate to a non-transitory computer-readable storage medium including a set of instructions for multi-device content distribution, the set of instructions executing on at least one computer processor to enable the computer processor to: identify media content served to a television client; identify a client internet protocol (IP) address associated with the television client; identify content relevant to the media content; submit, to a content exchange service, a request for content placement opportunities; receive content placement opportunities from the content exchange service, each content placement opportunity identifying at least a portion of a source IP address; identify, based on the provided portion of the source IP address, a subset of the content placement opportunities associated with the client IP address; identify content relevant to the media content; and provide the content for the subset of the content placement opportunities.

In general, in one aspect, embodiments relate to a method for adaptive multi-device content distribution based on associated internet protocol (IP) addressing, the method including: identifying media content served to a television client; identifying a client internet protocol (IP) address associated with the television client; identifying content relevant to the media content; submitting, by a computer processor and to a content exchange service, a request for content placement opportunities; receiving content placement opportunities from the content exchange service, each content placement opportunity identifying at least a portion of a source IP address; identifying, based on the provided portion of the source IP address, a subset of the content placement opportunities associated with the client IP address; identifying content relevant to the media content; and providing the content for the subset of the content placement opportunities. Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

In general, embodiments of the invention provide methods and systems for providing content for a client device. An instruction set defining one or more client-interactive controls can be identified and sent to the client device. The client device can be configured to display an image corresponding to at least one of the client-interactive controls. In response to a user input, the client device can be configured to perform an action based on a selected client-interactive control and a current state of the client device.

In general, embodiments of the invention provide methods and systems for providing advertisement content for a client device. An instruction set defining one or more client-interactive controls can be identified and sent to the client device. The client device can be configured to display an image corresponding to at least one of the client-interactive controls. In response to a user input, the client device can be configured to perform an action based on a selected client-interactive control and a current state of the client device.

Figure 1A:
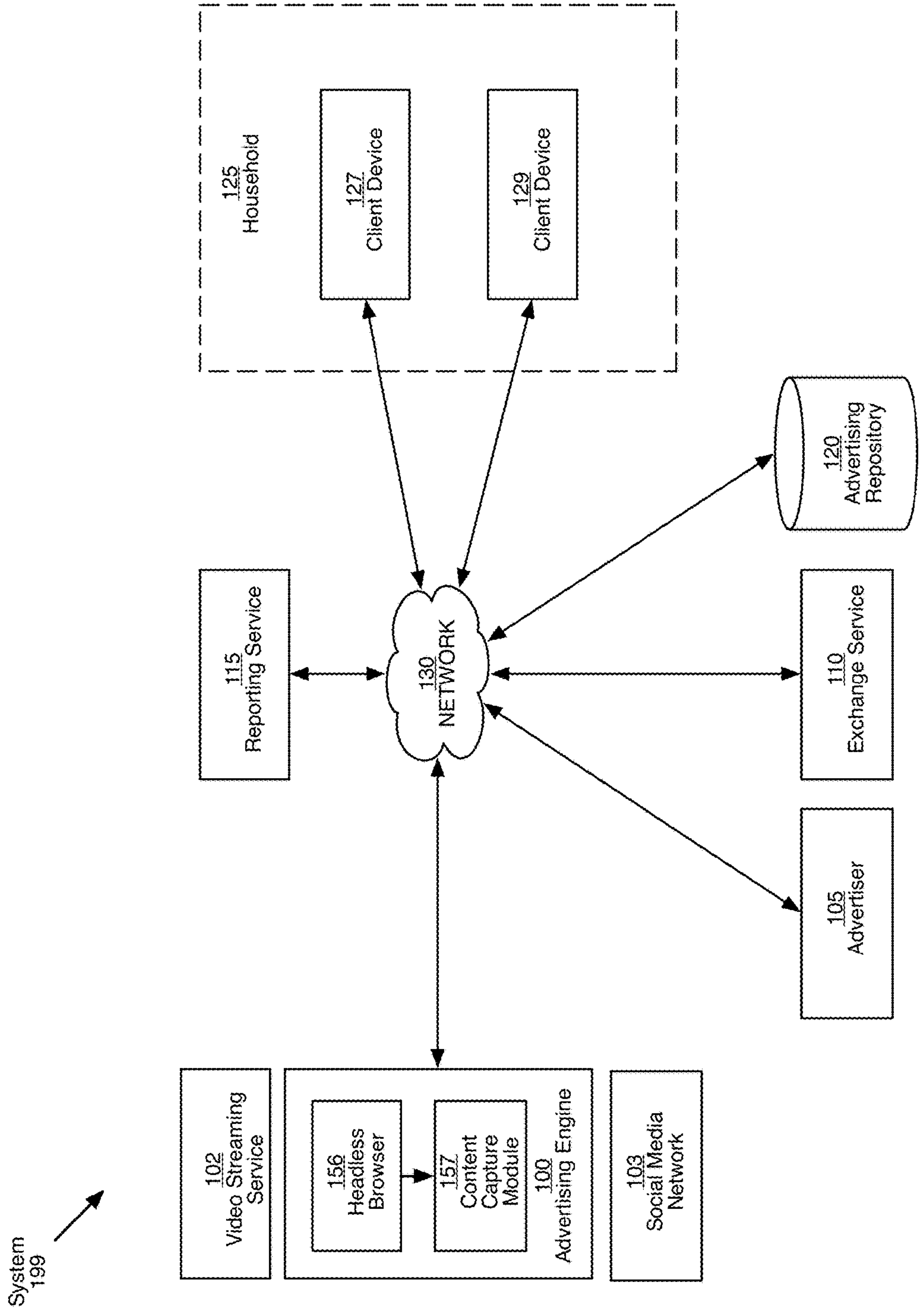
FIGS. 1A and 1B show schematic diagrams of systems, in accordance with one or more embodiments of the invention.

FIG. 1A shows a system (199) in accordance with one or more embodiments of the invention. As shown in FIG. 1A, the system (199) has multiple components including an advertising engine (100), an advertiser (105), an advertising exchange service (110), a reporting service (115), an advertising repository (120), household (125), client devices (127 and 129), and a network (130). Various components of the system (199) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component executing on a device, as well as any combination of these components within a given embodiment of the invention.

In one or more embodiments of the invention, the advertising engine (100) includes functionality to provide advertising content for one or more client devices (e.g., 127 and 129). The advertising engine (100) can be configured to provide advertising content in conjunction and/or in association with content served by any number of content servers (e.g., advertising exchange service (110), a video streaming service, a social media network, etc.). In one or more embodiments of the invention, the advertising engine (100) is a component of an advertising network including one or more content servers configured to obtain and store advertising content (e.g., in the advertising repository (120), for use by the advertising engine (100).

Figure 1B:
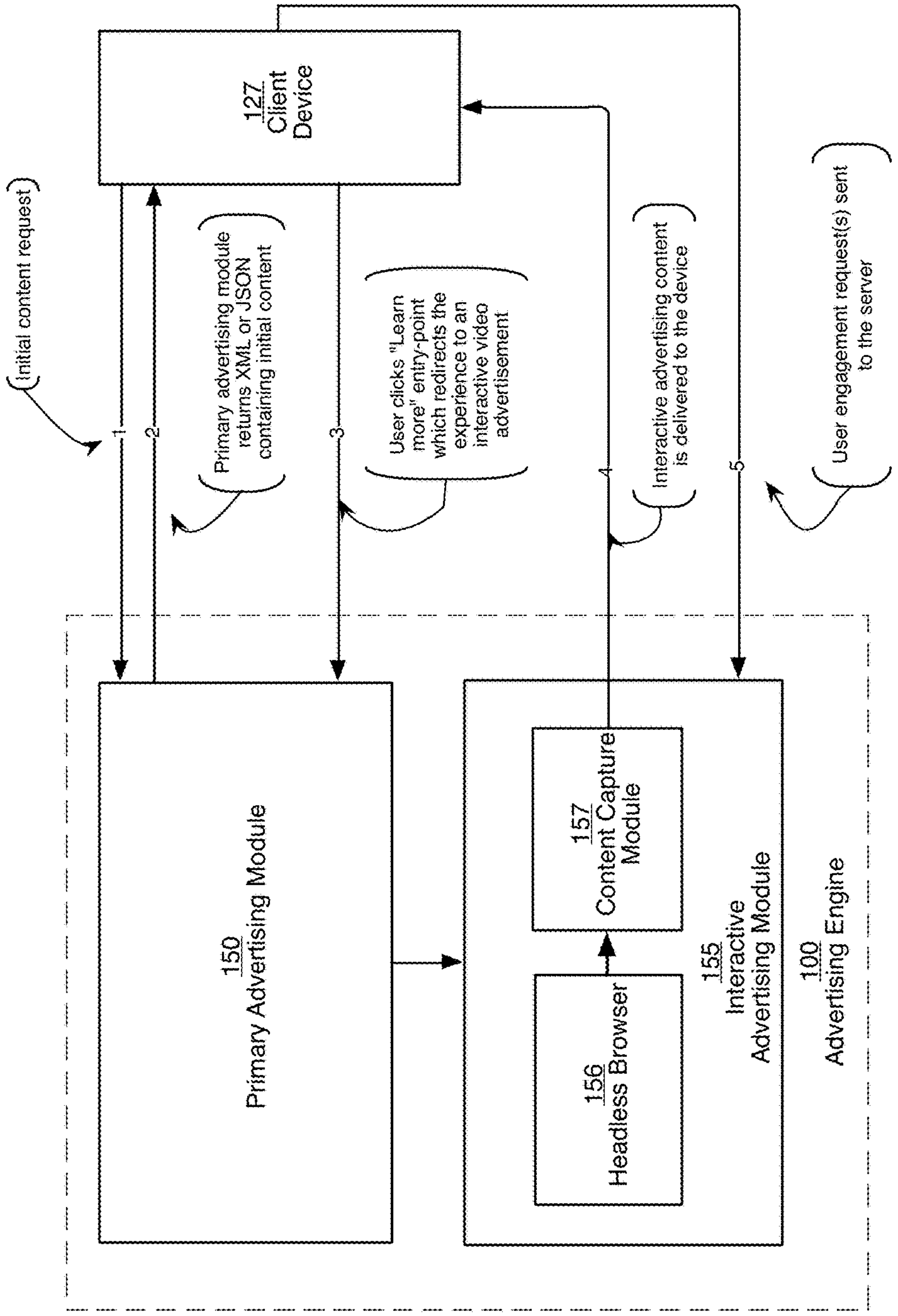

FIG. 1B shows an example implementation of the advertising engine (100) of FIG. 1A, in accordance with one or more embodiments of the invention. As shown in FIG. 1B, the advertising engine (100) has multiple components including a primary advertising module (150) and an interactive advertising module (155) including a headless web browser (156) and a content capture module (157). Various components of the advertising engine (100) can be located on the same device (e.g., a server, mainframe, Personal Computer (PC), and any other device) or can be located on separate devices connected by a network (e.g., a local area network (LAN), the Internet, etc.). Those skilled in the art will appreciate that there can be more than one of each separate component executing on a device, as well as any combination of these components within a given embodiment of the invention.

In one or more embodiments of the invention, the advertising engine (100) includes functionality to receive a content request generated by a client device. The content request can be any notification from the client indicating that the client is ready for receiving content, in accordance with various embodiments. In one or more embodiments, the content request is generated by a thin client application executing on the client device and can include or be sent in conjunction with information identifying a platform of the client device. In the example of FIG. 1B, the content request is received by the primary advertising module (150).

The client device can be configured to request a variety of different types of advertising content (e.g., an advertisement, a video including an advertisement, a web page including an advertisement, etc.). For example, the client device may require advertising content to be displayed before initiating playback of media content, the client device may require a commercial to be played upon reaching a predefined threshold time limit during playback of media content, the client device can detect a user request for advertising content, and/or the client device can detect a user request for secondary advertising content or menus during the display of an initial advertisement.

For example, a thin client application executing on a client device can be configured to detect a user input requesting a video to be streamed to the client. In response to the user input, the thin client application can generate a content request for a video advertisement associated with the requested video. In another example, a client device is configured to automatically play a video advertisement upon opening a web page. In this example, the content request is automatically generated and sent upon opening the web page. In one or more embodiments, the content request is routed through the advertising exchange service (110) and/or one or more other entities (e.g., another content provider service) before being sent to the advertising engine (100).

In one or more embodiments of the invention, the advertising engine (100) includes functionality to provide advertising content for the client device in response to the content request. The advertising content can be provided for a requesting application (e.g., a thin client application) executing on the client device. Examples of advertising content can include, but are not limited to, video, audio, a commercial, a banner ad, a survey, a questionnaire, a menu page, a webpage, a landing page, a login page, a slideshow, a map, and/or an input form. Advertising content can also include data and/or executable code associated with one or more advertisements. For example, a "container" or other data which (1) identifies external advertising content and/or (2) computer instructions for obtaining advertising content. The client device can then use the data and/or instructions (e.g., the "container") to request advertising content (e.g., an advertisement) from any number of sources external to the client device. In the example of FIG. 1B, the primary advertising module (150) is configured to provide the advertising content in response to an initial content request.

In one or more embodiments of the invention, the advertising engine (100) includes functionality to render some or all of the advertising content for display on the client device. For example, the advertising engine (100) can render a video advertisement for playback on a specified mobile device platform. The advertising content can be a static video and/or can be an interactive advertisement designed to be displayed in conjunction with, before, and/or after related content is displayed by the a client application. In one or more embodiments, in cases where the client application (e.g., a thin client application) is not capable of rendering some or all of the advertising content, the advertising engine (100) can be configured to perform server-side rendering of some or all of the advertising content. In this case, the thin client application is configured to display the rendered advertising content and to send user engagement requests to the advertising engine (100) in order to request modifications to the advertising content and/or to request new advertising content.

In one or more embodiments of the invention, the advertising engine (100) includes functionality to receive a user engagement request generated by the client device. The user engagement request can be generated based on a user input associated with advertising content. For example, a thin client application can generate a user engagement request in response to a user clicking a "Learn More" button in an advertisement (e.g., step "3" of FIG. 1B). In the example of FIG. 1B, the primary advertising module (150) receives the user engagement request from the client (127) and passes the request to the interactive advertising module (155) (e.g., by sending a message to the interactive advertising module (155)) to be fulfilled.

In one or more embodiments of the invention, the advertising engine (100) includes functionality to render advertising content for the specific platform of the client device. In one or more embodiments of the invention, an initial set of advertising content is generated and provided for the client device (e.g., step "1" of FIG. 1B). If a user input is detected in response to the initial content (e.g., step "3" of FIG. 1B), secondary advertising content may be generated for the client (e.g., by the interactive advertising module (155) of FIG. 1B). For example, the advertising engine (100) can be configured to (1) stream a video advertisement for the client device (initial advertising content, e.g., step "2" of FIG. 1B), (2) receive a user engagement request, and then (3) send secondary advertising content (e.g., step "4" of FIG. 1B) in response to the user engagement request to the client device. In one example, initial advertising content can be sent in response to any type of client request, while secondary advertising content can be sent specifically in response to a user input associated with the initial advertising content.

In one or more embodiments of the invention, the initial advertising content is provided in a static predefined format across all clients, while the secondary content is rendered specifically in the format of each requesting client. In other words, the secondary advertising content can be rendered in a platform-dependent format of the client device. For example, the initial content can be a video, image, audio, or other type of content streamed or provided for the client device in a platform-independent format, while the secondary advertising content rendered in a platform-dependent format includes a richer interactive user interface (UI) enabling user interaction. Alternatively, in one or more embodiments of the invention, both the initial and secondary content are server-side rendered in the platform-dependent format of the client and/or include dynamic UI elements. In yet another embodiment, the initial content is rendered by the client device, while the advertising content is rendered by the advertising engine (100).

In one or more embodiments of the invention, the advertising engine (100) includes functionality to provide the rendered advertising content for display on the client device. Providing the advertising content can include establishing a connection with the client device, and/or maintaining the connection while the advertising content is displayed to a user of the client device. In one or more embodiments, the advertising engine (100) ends the connection upon closing or receiving a request to close a user interface displaying the advertising content. As discussed, in the example of FIG. 1B, the rendered advertising module can be provided by the interactive advertising module (155).

In one or more embodiments of the invention, the advertising engine (100) includes functionality to continue to leave open a connection with the client in order to provide additional client instructions to the client. For example, after receiving a content request, a connection between the advertising engine (100) and client device may be opened. The advertising engine (100) may continue to leave the connection open through keep-alive signals. As a result, the advertising engine (100) may continue to provide further client instructions to the client device through the open connection.

In one or more embodiments of the invention, an application (e.g., a thin client application) executing on the client device includes functionality to receive the advertising content and to display the advertising content to a user. In one or more embodiments, the advertising content includes an interactive user interface. For example, the application can be configured to display the interactive user interface to a user and to receive user input by an input device (e.g., input device (628) of FIG. 5, discussed below). In response to the user input, the application can send one or more user engagement requests to the advertising engine (100) and can receive modifications to the advertising content from the advertising engine (100). In the example of FIG. 1B, the interactive user interface and subsequent modifications are provided by the interactive advertising module (155) in response to one or more user engagement requests.

In one or more embodiments of the invention, a user engagement request includes a command for modifying the advertising content. For example, an interactive user interface included in the advertising content can be modified by sending a user engagement request including a command to the advertising engine (100). The advertising engine (100) can be configured to render new advertising content in response to one or more commands. For example, a command can be generated based on selecting a menu item, navigating a web page, moving a cursor, selecting a streaming video or other content, and/or any other form of interaction with advertising content displayed by the client device. Each command can request a predefined modification to the content. For example, a scroll command can request a page to be scrolled, while a page selection command can request that a new page be displayed.

In one or more embodiments of the invention, the advertising engine (100) includes functionality to provide one or more instructions for the client application. An instruction can request the client application to perform a specified action. In one or more embodiments, the instruction requests a tracking pixel from an external reporting service. In one or more embodiments, the instruction can be associated with any portion of the advertising content and can include a condition for performing the specified action. For example, the instruction can request a tracking pixel from a reporting service upon detecting engagement with a specified user interface (UI) element. In this example, the client application detects a user engagement with the UI element and subsequently triggers the instruction to execute. Examples of engagement with a UI element can include, but are not limited to, viewing a web page, selecting a button, hovering over a display area, interacting with a widget, typing into a text box, and viewing a particular content item for a period of time exceeding a predefined threshold. In the example of FIG. 1B, the one or more instructions are provided by the interactive advertising module (155) in conjunction with the secondary advertising content. In another example, multiple instructions are each mapped to different web pages. In this example, in response to detecting engagement with a web page (e.g., detecting the user has viewed the web page, displaying the web page, etc.), the advertising engine (100) is configured to execute the instruction in order to request a tracking pixel from a third party server (e.g., a reporting service). In one or more embodiments, no initial advertising content and/or user engagement requests are needed to generate and provide the secondary advertising content. For example, the advertising engine (100) can be implemented without the primary advertising module (150)).

In one or more embodiments of the invention, an identifier of a client device is identified using a tracking pixel or other tracking mechanism identified by the client. For example, the tracking pixel may be identified by a client device and a tracking request may be sent to the advertising engine (100), reporting service (115), and/or a data provider, from the client device. The request can include an IP address of the client device, and the IP address can be stored by the advertising engine (100) in the advertising repository (120). The advertising engine (100) can be configured to associate the IP address with a user profile and/or a household profile, in accordance with various embodiments. In one or more embodiments of the invention, a response from the advertising engine (100), reporting service (115), and/or data provider is sent to the client device. The response may include an image, pixel, or other requested content.

In one or more embodiments of the invention, the advertising engine (100) is configured to send multiple instructions associated with various different portions of the advertising content to the client device. Although some or all of the advertising content can be rendered by the advertising engine (100), in one or more embodiments, it may be advantageous to perform certain actions on the client. For example, in order to enable advertising reporting functionality of the reporting service (115), the client application may be required to request the tracking pixels directly from the reporting service (115). In this example, certain reporting services gather client-specific data required for performing analytics and/or calculating advertising-related data. Thus, the client must make certain requests (enabled by sending instructions to the client for those specific requests) directly to the reporting service (115) and/or other external entities.

In one or more embodiments of the invention, the advertising engine (100) is configured to communicate with multiple reporting services. For example, the advertising engine (100) can be configured to provide content referencing any number of tracking pixels or images, each referencing a different reporting service. An internal reporting service communicatively coupled to the advertising engine (100) (or a component of the advertising engine (100)) can perform analytics across multiple sets of data served to multiple clients of the advertising engine (100). A third party reporting service external to the advertising engine (100) can be configured to provide independently verified analytics/engagement data to one or more advertising customers or partners having a relationship with the advertising engine (100).

In one or more embodiments of the invention, the advertising engine (100) is configured to identify content served to a client. Examples of content can include, but is not limited to, broadcast media content served to a television device (e.g., a cable box), streaming video served to a mobile device, satellite media content served to a client including a satellite receiver, local broadcast television content received by a television including an antenna, and any other content provided to a client computing device. The content can include any type of media, associated metadata, and/or advertisements in accordance with various embodiments of the invention.

In one or more embodiments of the invention, the advertising engine (100) is configured to obtain an identifier associated with the client. The identifier can be any data usable to either uniquely or non-uniquely identify a client computing device or a network item associated with the client computing device (e.g., a router, switch, gateway, etc.). For example, the advertising engine (100) may identify an internet protocol (IP) address associated with the television client or a router to which the client is connected.

In one or more embodiments of the invention, the advertising engine (100) is configured to identify advertising content relevant to the content served to the client. In one or more embodiments, the advertising engine (100) is configured to match the content to the advertising content using any method for determining content relevancy (e.g., semantic analysis, keyword matching, etc.). For example, metadata associated with an advertisement can be used to match the advertisement to a television program based on one or more keyword categories of the program. Determining relevancy can be performed by a related or external module, such that the advertising engine (100) is configured to receive a mapping of advertising content to media content. For example, a user of the advertising exchange service (110)

can select advertisements to associate with media content using a user interface web portal.

In one or more embodiments of the invention, the advertising engine (100) is configured to submit, to the advertising exchange service (110), a request to provide the advertising content for one or more associated computing devices. The associated devices can be identified based on at least a portion of the identifier associated with the client. For example, a portion of an internet protocol (IP) address of the client can be matched to IP addresses of one or more associated devices.

In one or more embodiments of the invention, the advertising engine (100) is configured to provide the advertising content for the associated client computing devices. The advertising content can be provided for the associated devices directly from the advertising engine (100), via the advertising exchange service (110), and/or via any other intermediary entity, in accordance with various embodiments of the invention. In one or more embodiments of the invention, the advertising engine (100) establishes a connection with each associated device and maintains the connection while a user of the device navigates a menu of options associated with the advertising content. For example, the menu may provide the user with one or more options for viewing advertising content.

In one or more embodiments of the invention, the advertising engine (100) is configured to receive content placement opportunities from the advertising exchange service (110). Each content placement opportunity may identify at least a portion of an identifier of a client (e.g., a partially masked IP address). The identifiers can be persistent and unique, or can be temporary and non-unique, in accordance with various embodiments of the invention.

In one or more embodiments of the invention, the advertising engine (100) is configured to determine an identifier of an associated computing device. The advertising engine (100) can then be configured to identify a relationship between the identifier of an associated computing device and the identifier of the client. For example, the advertising engine (100) can determine that an IP address of a tablet computer is the same as an IP address of a set-top box. In this example, the IP address of the initial client device can be assigned to a networking device serving multiple other devices in a household or local area network (LAN). Associated devices can be identified by the advertising engine (100) based on sharing the same or similar IP address. IP addresses of the client devices can be determined, for example, by means of a tracking pixel or other mechanism, in accordance with various embodiments of the invention.

In one or more embodiments of the invention, the advertising engine (100) includes functionality to receive an encoded identifier for a device from an IP matching service (not shown). Thus, the advertising engine (100) can receive a first encoded identifier associated with a first client and a second encoded identifier associated with a second client. In one or more embodiments, the advertising engine (100) includes functionality to determine that the identifiers are associated (e.g., with the same IP address or household). Alternatively or additionally, in one or more embodiments, the advertising engine (100) includes functionality to provide the identifiers to the IP matching service in conjunction with a request to determine if the identifiers are associated. The IP matching service can be configured to: (1) provide a response indicating that the identifiers are not related or (2) confirm that the identifiers are associated and/or identify a type of association between the identifiers (e.g., same IP address, same household, same geographic region, etc.).

In one or more embodiments of the invention, the advertising engine (100) includes functionality to obtain a partial identifier of a client's IP address from an external source (e.g., advertising exchange service (110)). For example, the advertising engine (100) can obtain a truncated or redacted portion of the IP address for each client from the advertising exchange service (110). The advertising exchange service (110) can be configured to truncate the IP address or otherwise mask the identifier of the client such that the client is not directly/uniquely identifiable based on the truncated identifier. In this way, the exact identifier of the client can be hidden from the advertising engine (100). At the same time, the advertising engine (100) can be configured to match at least a portion of the IP addresses of two clients in order to determine whether the IP addresses are associated (e.g., if the two IP addresses correspond to devices in the same geographic region). The advertising engine (100) can be configured to identify any other association between the IP addresses, depending on the amount of the IP address or other identifier provided, in accordance with various embodiments.

In one or more embodiments of the invention, the advertising engine (100) includes functionality to select a subset of the content placement opportunities associated with the identifier of the client. For example, the advertising engine (100) can obtain identifiers of each of the content placement opportunities (i.e., identifiers of the clients associated with each opportunity) and then compare each identifier to the identifier of the client in order to determine whether an association exists. The advertising engine (100) can be configured to determine any type of association between the clients. For example, as discussed above, the advertising engine (100) can be configured to provide the identifiers to an IP matching service and to receive the association from the IP matching service. In another example, the advertising engine (100) compares IP addresses of the content placement opportunities with the IP address of the client. In this example, the advertising engine (100) can determine that a subset of the IP addresses match (or at least partially match) the IP address of the client.

In one or more embodiments of the invention, the advertising engine (100) includes functionality to receive an identification of one or more content placement opportunities associated with the client computing device. Identification can be included in a request for advertising content received directly from the client device, or via an intermediary service (e.g., advertising exchange service (110)). Providing the advertising content for the client computing device can be performed in response to receiving the identification. Alternatively, in one or more embodiments, the advertisement engine (100) is configured to provide the advertising content and a set of identifiers of client devices and/or a household or other grouping of related devices to the advertising exchange service (110). The advertising exchange service (110) can then serve the advertising content to the relevant devices according to the parameters provided by the advertising engine (100).

In one or more embodiments of the invention, the advertising engine (100) includes functionality to determine that the computing device is a non-mobile television client. The advertising engine (100) can be configured to detect multiple content requests from the computing device and to determine that the content requests originated from the same geographic location or within a predefined geographic proximity. Based on the requests originating from the geographic location or within a predefined geographic proximity, the advertising engine (100) can then determine that the device is non-mobile. The advertising engine (100) can be configured to determine that the computing device is non-mobile based on identification data associated with the device (e.g., a media access control (MAC) address, internet protocol (IP) address, or other identifier). The identification data can identify a make, model, type, category or other attribute of the computing device. The advertising engine (100) can be configured to determine that the computing device is a non-mobile television client based on the content served to the device. For example, a device that receives a predefined amount or percentage of its content from a broadcast media source can be identified as a television client.

In one or more embodiments of the invention, the advertising engine (100) includes functionality to associate one or more devices with the household profile based on one or more criteria. For example, the advertising engine (100) can determine a percentage of the requests of a device originating from a common IP address. The advertising engine (100) can then compare the percentage to a predefined threshold. If the threshold is exceeded (e.g., at least 90% of the requests of the client originate from a common IP address), the client device can be linked to the household profile associated with the common IP address. In another example, the advertising engine (100) is configured to link a client device to the household profile based on determining that (1) the client device is non-mobile and that (2) the client device requests data from an IP address associated with the household profile. In this example, mobile client devices may be associated with the household profile upon satisfying one or more different criteria.

In one or more embodiments of the invention, the advertising engine (100) includes functionality to construct a household profile associated with the IP address. The household profile can be constructed at least in part based on the content served to one or more clients within the household. For purposes of this disclosure, a household can refer to any grouping of related or associated computing devices. Examples of a household can include a local area network of a residential address, a wide area network of a business, and devices across multiple separate dwellings within a multi-dwelling structure. The advertising engine (100) can be configured to include content preferences (e.g., commonly viewed topics/genres/categories of content) as part of the household profile. The household profile can further include information identifying devices within the household (e.g., operating system/platform, make/model, type of device, etc.), users of the household (e.g., demographic information about multiple users), and/or behavioral habits (e.g., typical access times, average session duration, requesting URLs, favorite/commonly visited websites, browsing history, and etc.). In one or more embodiments of the invention, the advertising engine (100) is configured to identify relevant advertising content to serve to one or more client devices based on the household profile. The advertising engine (100) can also be configured to build and/or supplement the household profile based on content received by any number of client devices associated with a common identifier of the household. For example, multiple computing devices identifying the same or related IP addresses can be designated as being within a common household. In this example, the content received by the multiple computing devices is used to create the household profile.

In one or more embodiments of the invention, the advertising engine (100) includes functionality to create/modify the household profile based on one or more non-mobile client devices. The advertising engine (100) can be configured to associate client devices with a household profile based on one or more attributes of the client device. For example, the advertising engine (100) may ignore mobile devices when creating/modifying a household profile. Thus, given a set of devices requesting content from a common IP address associated with a household profile, the advertising engine (100) may be configured to link only the non-mobile devices of the set of devices to the household profile. Alternatively, in another example, the advertising engine (100) may weight non-mobile devices more heavily than mobile devices in creating/modifying the household profile.

In one or more embodiments of the invention, the advertising engine (100) includes functionality to assign, based on a frequency and/or proportion of content requests, a new computing device to the household profile. For example, 50% of the requests may originate from a common IP address, while the remaining 50% originate from other IP addresses. In this example, the advertising engine (100) determines that at least a predefined portion of the requests (i.e., exceeding a predefined percentage) originate from the common IP address and, in response, assign the client device to the household profile. The advertising engine (100) can also use user-provided information to associate other computing devices with the household profile. For example, the advertising engine (100) may request confirmation of whether the client device is part of the household directly from the user (e.g., through a prompt displayed by the client). The user can then indicate whether the device is part of the household or not (e.g., "Are you currently connecting from your home?"). The advertising engine (100) can also be configured to receive information associating one or more client devices with the household from a third party entity. For example, the advertising engine (100) may receive information associating the client device to the household from an Internet service provider (ISP) serving the client device.

In one or more embodiments of the invention, the advertising engine (100) includes functionality to provide relevant content to the new computing device based on the household profile. The advertising engine may calculate a relevance (e.g., a relevance score) between a variety of candidate content items and the household profile. Keywords, categories, and/or other attributes of the household profile can be matched or scored to similar attributes among a set of candidate content items. Based on the calculated relevance, the advertising engine (100) can then select a subset of the highest ranking candidate content items to be provided to the new computing device. The relevant content provided to the new computing device (or any number of associated devices) can include a customized advertisement based on household information associated with the IP address. The customized advertisement may include or be served in conjunction with a tracking pixel, in accordance with various embodiments of the invention.

In one or more embodiments of the invention, the advertising engine (100) includes functionality to identify a user profile associated with the computing device. While the household profile may be associated with multiple users and/or devices associated with a common location, the user profile may be specific to an individual user. The user profile can include identifying information of the user, browsing history, content viewing history, references to one or more external sources of user information (e.g., a social networking profile), location information (e.g., home address), billing information, and/or any other information associated with an individual user. In one or more embodiments of the invention, the advertising engine (100) is configured to obtain user profile information from a variety of external sources (e.g., partner entities, advertising exchange service (110), billing module (not shown), and etc.) and/or to aggregate user profile information in the advertising repository (120). For example, the advertising engine (100) can be configured to obtain HTTP cookie data from a client device and to utilize the cookie data in order to create or augment a user profile of a user. User profile information can also include subscription information (e.g., from a streaming media service) and/or membership data from an affiliated website or data provider.

In one or more embodiments of the invention, the advertising engine (100) includes functionality to supplement the household profile based on the user profile. One or more user profiles can be linked to a household profile and/or used to select or modify a representative household profile (e.g., a ranking of favorite genres, content categories, etc.) which may be then used to select relevant content for devices within the household. The advertising engine (100) can be configured to use the most granular information available to select relevant content for a given client device. Thus, for example, if no user profile information is associated with the device, the advertising engine (100) may use household profile information to select relevant content. If no household profile information is associated with the client device, the advertising engine (100) may use associated location and/or demographic information to select relevant content for the client device.

In one or more embodiments of the invention, the advertising engine (100) includes functionality to provide an instruction to request a tracking pixel from an external reporting service (115) at a predefined interval. In response to the instruction, the client application can then request the tracking pixel from the reporting service (115) at the predefined interval while displaying the advertising content. Upon closing of the advertising content, the client application can be configured to cease requesting the tracking pixel. In one or more embodiments, the reporting service (115) is configured to estimate a display time of the advertising content based on a number of accesses of the tracking pixel from the reporting service. Thus, if the instruction dictates that the pixel should be requested every 2 seconds, the reporting service (115) can be configured to calculate a number of times (N) the tracking pixel was requested during the current session, and to estimate the display time as N*2.

In one or more embodiments of the invention, the advertising engine (100) is configured to obtain some or all of the advertising content from the advertising exchange service (110). The advertising engine (100) can be configured to perform required rendering for various different client platforms and to serve the rendered content to one or more client devices. Furthermore, the advertising engine (100) can be configured to receive requests on behalf of client devices from the advertising exchange service (110). Thus, the advertising exchange service (110) can include functionality to match specific advertising content to client requests based on predefined advertiser subscription data or other related information.

In one example, the advertising exchange service (110) may provide content placement opportunities on client devices to potential advertisers (e.g., through an automatic bidding process). Accordingly, the advertising exchange service (110) may act as a "middleman" between the advertiser (105) and a client device (e.g., 127 and 129). For example, the advertising exchange service (110) may be coupled with the client device through the network (130). The advertising exchange service (110) may request advertising content that will be ultimately provided to the client device. For example, the advertising exchange service (110) may receive the content request from the client device and in turn communicate the content request to the advertising engine (100). Alternatively, the advertising exchange service (110) may determine that an advertisement should be shown on the client device and therefore generate a content request for an advertisement from the advertising engine (100) that will be ultimately provided to the client device. In one or more embodiments of the invention, user engagement requests from the client are also routed through the advertising exchange service (110). Regardless of the format or specific request, user engagement request can refer to any request or series of requests resulting from a user input associated with advertising content. Thus, the advertising exchange service (110) can be configured to receive a notification from the client and request advertising content from the advertising engine (100) in response to the notification. In this example, both the notification and the subsequent request can be referred to as a single user engagement request, since the notification and the subsequent request were caused by a common user input.

In the example of FIG. 1B, the interactive advertising module (155) optionally includes a headless web browser (156) configured to render advertising content for one or more client platforms. Thus, in one or more embodiments, some or all of the rendering functionality of the advertising engine (100) is performed by the headless web browser. The headless web browser (156) (or other component of the advertising engine responsible for rendering) can be configured to emulate presentation of one or more web pages in order to serve content rendered for a specified platform. The headless web browser (156) can be configured to render an instance of the web page on the server, and to emulate interactions with the instance of the web page in response to one or more user engagement requests. By performing server-side rendering of some or all advertising content delivered to a client, development of client applications may be simplified. In one or more embodiments of the invention, a traditional web browser and/or another component of the interactive advertising module (155) is used to render advertising content for one or more clients.

In the example of FIG. 1B, the content capture module (157) includes functionality to capture content intended for the client (127) from the headless browser (156) and to provide the captured content to the client (127). In other words, the content capture module (157) is configured to extract the advertising content from the headless browser (156) and/or to ignore non-advertising related content generated, for example, during emulation of a web page. Content generated by the headless browser can be stored by the content capture module (157) and provided to the client (127) at a later time. For example, the content capture module (157) can be configured to stream a video to the client (127) over a period of time, although some portion (or the entirety) of the video can be rendered by the headless browser (156) in advance of the streaming.

In one or more embodiments of the invention, the client devices (127 and 129) represent any type or form of computing device or system. For example, the client device may be an Internet-connected television, a smart television, a smart Blu-ray player, an automobile Internet-connected computer, a gaming console, a streaming set-top box, a mobile telephone, a tablet computer, a personal computer, and/or any operable to display advertisements or receive user actions. The term television client can refer to any computing device connected to or associated with a television. Examples of a television client can include a set-top box, smart TV, cable box, Internet-connected television, and any other television-related device. In one or more embodiments of the invention, the client devices (127 and 129) are both located within the same household (125). It should be appreciated that in one or more embodiments of the invention, the client devices (127 and 129) are not located within the same household.

In one or more embodiments of the invention, the client devices (127 and 129) may be operable to receive or capture user actions (e.g., a television remote control event, a gaming console controller event, a touchscreen event, a mobile telephone event, a tablet computer event, a personal computer event, a gesture event, a movement event, a gyroscope event, an accelerometer event, a voice command, and/or any other event receivable by a client device). For example, a user may use the directional pad (D-pad) of a television remote control to provide directional commands and the "OK" or "Select" button of the television remote control to make a selection.

Figure 3A:
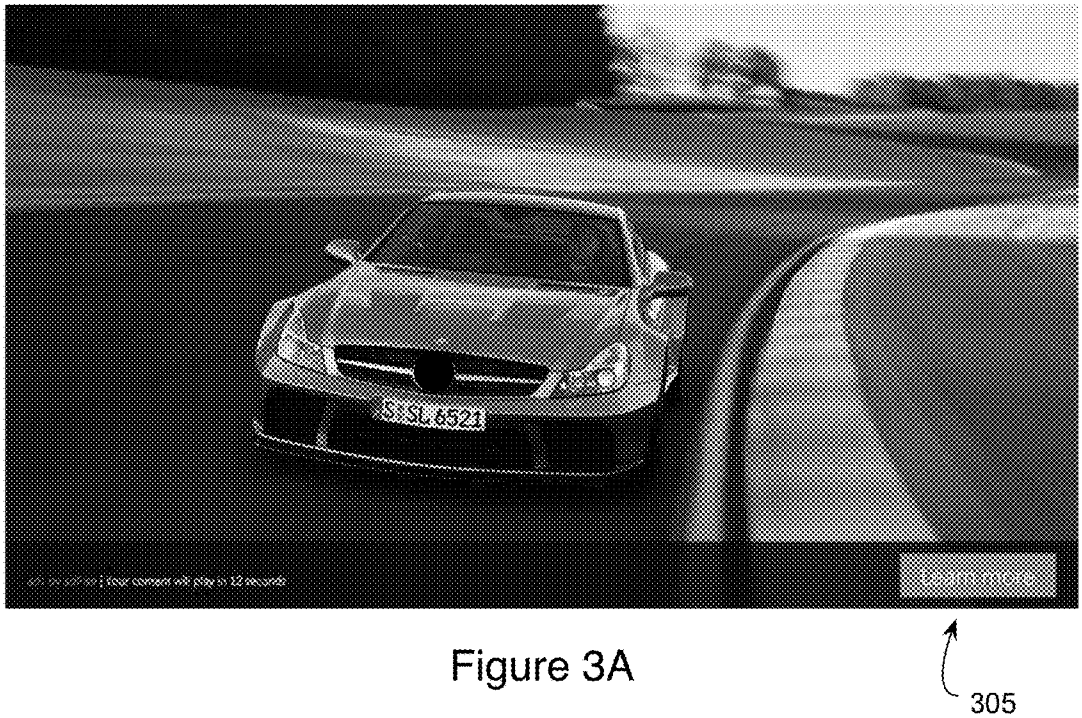
FIGS. 3A-3E and 4 show exemplary depictions of advertising content, in accordance with one or more embodiments of the invention.
Figure 3B:
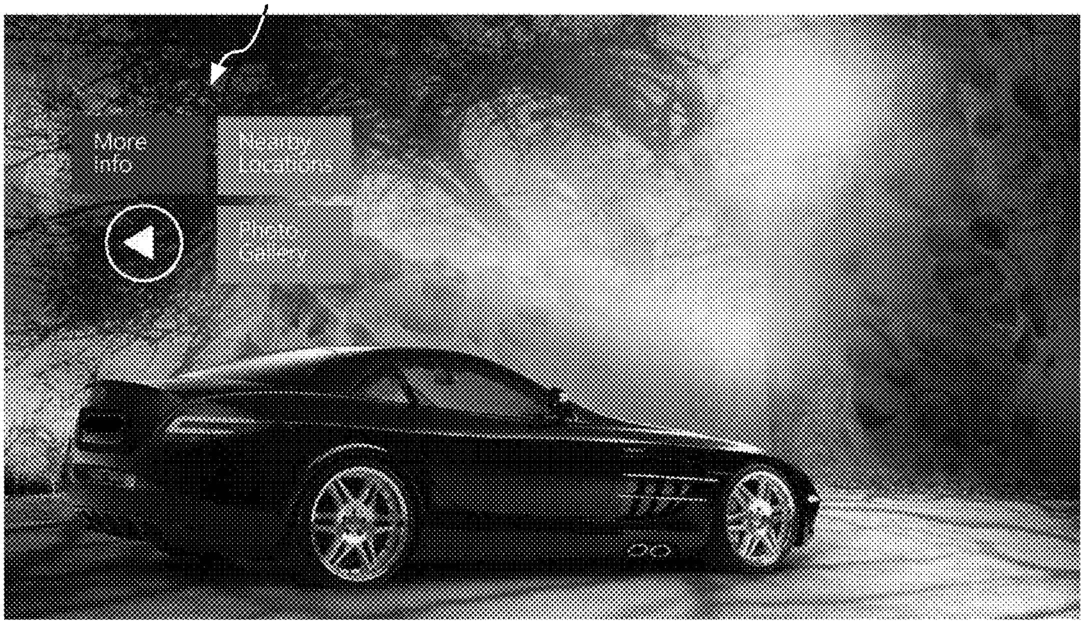
Figure 3C:
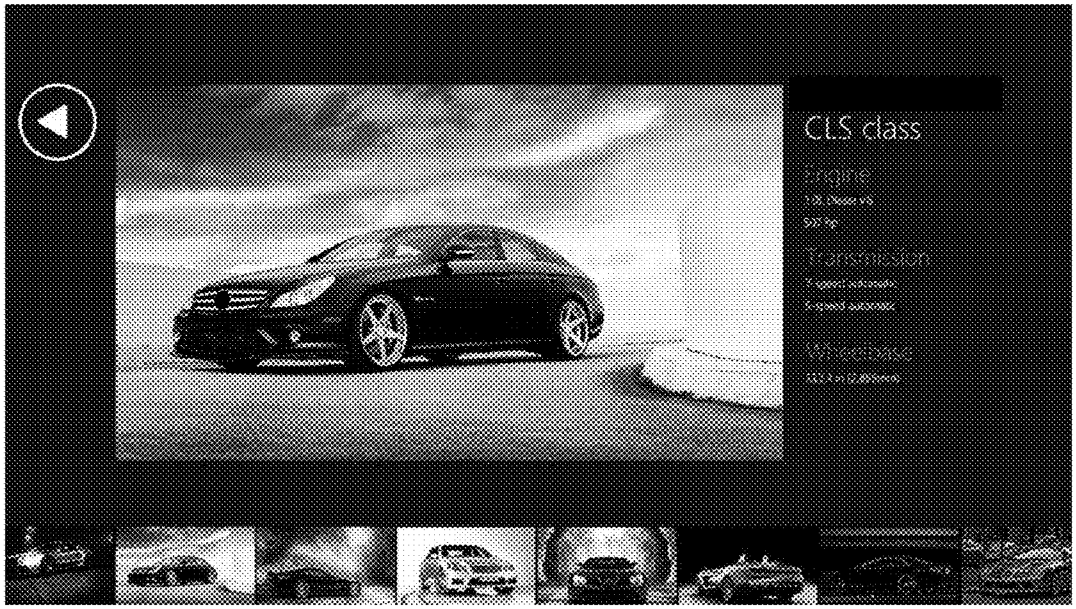
Figure 3D:
Figure 3E:

FIGS. 3A-3E show exemplary depictions of advertising content, according to one or more embodiments of the invention. The advertising content may be displayed on the client device. In one or more embodiments, the advertising content includes one or more controls. For example, FIG. 3B shows advertising content including buttons (310) for More Info, Nearby Locations, Photo Gallery, and a back button. A user may perform a selection of one of the buttons (310). In response to the user input, the client device may generate a user engagement request to be sent to the advertising engine (100) in order to request modifications to the advertising content. For example, the user interface depicted by FIG. 3B is modified to the user interface depicted by FIG. 3D in response to the user clicking the "More Info" button shown in FIG. 3B. Upon clicking the button, a user engagement request is sent through an advertising exchange service (110) to an advertising engine (100). In response to the user engagement request, the advertising engine (100) renders the advertising content depicted by FIG. 3D and sends the rendered content to the client device for display. Similarly, the advertising content depicted by FIG. 3E is provided in response to the user selecting the "Nearby Locations" button shown in FIG. 3B.

In one or more embodiments of the invention, the client device first provides the content request to the advertising exchange server (110), which in turn sends a content request to the advertising engine (100). In this way, the advertising exchange server (110) can be used to provide a platform for selecting initial advertising content for one or more users of the client device (e.g., 127 and 129).

Continuing to refer to the example of FIG. 3B, if the advertising engine (100) receives a client event reflecting a selection of the More Info button, the advertising engine (100) may generate an advertisement with more information about a product (e.g., the advertisement shown by FIG. 3C).

In one or more embodiments of the invention, the advertising content is generated by an external service and stored in the advertising repository (120) for use by the advertising engine (100). Thus, it should be appreciated that, instead of generating the advertisement, the advertising engine (100) can be configured to instead access the advertising repository (120) to provide a previously generated advertisement.

In one or more embodiments of the invention, the advertising engine (100) includes functionality to first compress and/or encrypt the advertising content before providing for the client device. Further, the advertising engine (100) may be configured to send the advertising content in various formats, for example, as an H.264 stream, as an MP4 stream, as an HTTP Live Streaming (HLS) stream, and so on.

In one or more embodiments of the invention, the advertising engine (100) includes functionality to send the advertising content over a network. For example, the advertising engine (100) may send the advertising content through the network (130) to the client device for eventual display on the client device. In one or more embodiments, advertising content can be generated in response to one or more user engagement requests and sent to the client device. Accordingly, the advertising content can include an interactive user interface that may be controlled, manipulated, or navigated by a client device.

In one or more embodiments of the invention, the client is configured to send one or more user engagement requests to the advertising engine (100). For example, a user engagement request may include a command for navigating from a current page to a previous page. For example, if FIG. 3A depicts a previous screen, the command may request to navigate from the advertisement screen depicted in FIG. 3B back to the advertisement screen depicted in FIG. 3A.

Figure 4:
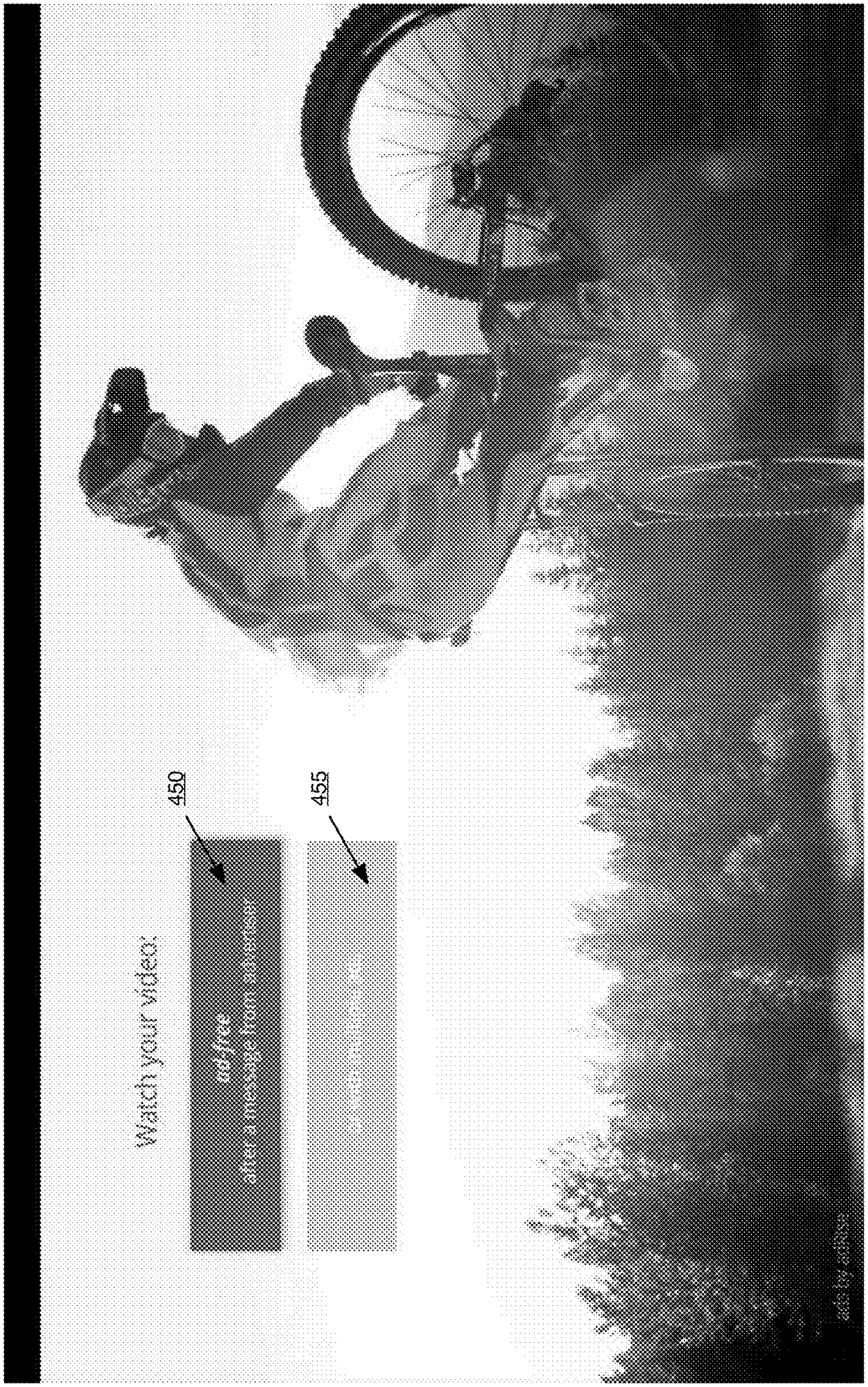

FIG. 4 shows an exemplary depiction of an image including an indication of at least one of the plurality of client-interactive controls, according to one or more embodiments of the invention. In the example of FIG. 4, the user of a television (TV) decides to view a television program. The user makes a selection corresponding to the program using a television remote. In response the user's selection, the television requests content from an external advertising engine. The advertising engine sends the fictional markup language formatted text, recited below under the heading "Fictional Markup Language Formatted Text, " to the client.

The client receives the formatted text along with the image of FIG. 4 containing depictions of a set of client-interactive controls (450 and 455). As dictated by the fictional markup code example above, each of the client-interactive controls corresponds to at least one image, depending on the current image displayed by the client device. In other words, the markup code defines a set of images corresponding to the depicted controls such that the client device can display a different one of the images depending on the user's selection (e.g., using the television remote). In this way, in one or more embodiments, the client device can be configured to provide an interactive menu of options to the user via static images and without the need for dynamic rendering of a user interface. Thus, the client-interactive controls can be displayed across a variety of different platforms and devices without the need for platform-dependent rendering. Furthermore, thin client devices without the hardware and/or software capability to perform complex client-side rendering of user interfaces can be used to provide a menu of user-selectable content provided by the remote advertising engine.

In one or more embodiments of the invention, the advertising engine (100) is a software application or a software service (e.g., a set of related software applications) configured to execute on one or more hardware processors. The advertising engine (100) can include one or more processes configured to concurrently send and receive data from multiple external entities (e.g., client devices, advertising exchange service (110), advertising repository (120), etc.). The advertising engine (100) can be a component of a service-oriented architecture (SOA) or any other software platform, either inside or outside of an advertising network, in accordance with various embodiments. In one or more embodiments of the invention, one or more components of the advertising engine (100) reside in a cloud computing application in a network distributed system. In one or more embodiments of the invention, advertising engine (100) is integrated within or operatively connected to one or more other components of the system (199) (e.g., advertising exchange service (110)).

In one or more embodiments of the invention, the primary advertising module (150) and the interactive advertising module (155) are software applications or software services (e.g., a set of related software applications) configured to execute on one or more hardware processors. The primary advertising module (150) and the interactive advertising module (155) can include one or more processes configured to concurrently send and receive data from multiple external entities (e.g., client devices, advertising exchange service (110), advertising repository (120), etc.). The primary advertising module (150) and/or the interactive advertising module (155) can be components of a service-oriented architecture (SOA) or any other software platform, either inside or outside of an advertising network, in accordance with various embodiments. In one or more embodiments of the invention, one or more components of the primary advertising module (150) and/or the interactive advertising module (155) reside in a cloud computing application in a network distributed system. In one or more embodiments of the invention, primary advertising module (150) and/or the interactive advertising module (155) is integrated within or operatively connected to one or more other components of the system (199) (e.g., advertising exchange service (110)).

In one or more embodiments of the invention, the advertising exchange service (110) and the reporting service (115) are software applications or software services (e.g., sets of related software applications) configured to execute on one or more hardware processors. Thus, advertising exchange service (110) and reporting service (115) can include one or more processes configured to concurrently send and receive data from multiple external entities (e.g., advertising engine (100), etc.). The advertising exchange service (110) and/or the reporting service (115) can be components of a service-oriented architecture (SOA) or any other software platform, either inside or outside of an advertising network, in accordance with various embodiments. In one or more embodiments of the invention, one or more components of the advertising exchange service (110) and/or the reporting service (115) reside in a cloud computing application in a network distributed system. In one or more embodiments of the invention, advertising exchange service (110) and/or the reporting service (115) is integrated within or operatively connected to one or more other components of the system (199).

In one or more embodiments of the invention, the advertising repository (120) is a database and/or storage service residing on one or more servers. For example, the advertising repository (120) can be implemented as a storage service using service-oriented architecture (SOA) and configured to receive requests for data and to provide requested data to other components of the system (199). In another example, the advertising repository (120) can include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application can be used, in accordance with various embodiments of the invention.

In one or more embodiments of the invention, the advertising repository (120) is a separate application or set of applications residing on one or more servers external (and communicatively coupled) to the system (199). Alternatively, in one or more embodiments of the invention, the advertising repository (120) can be an integrated component of an advertising system and/or can reside, either partially or entirely, on one or more common hardware devices (e.g., a server).

Figure 2:
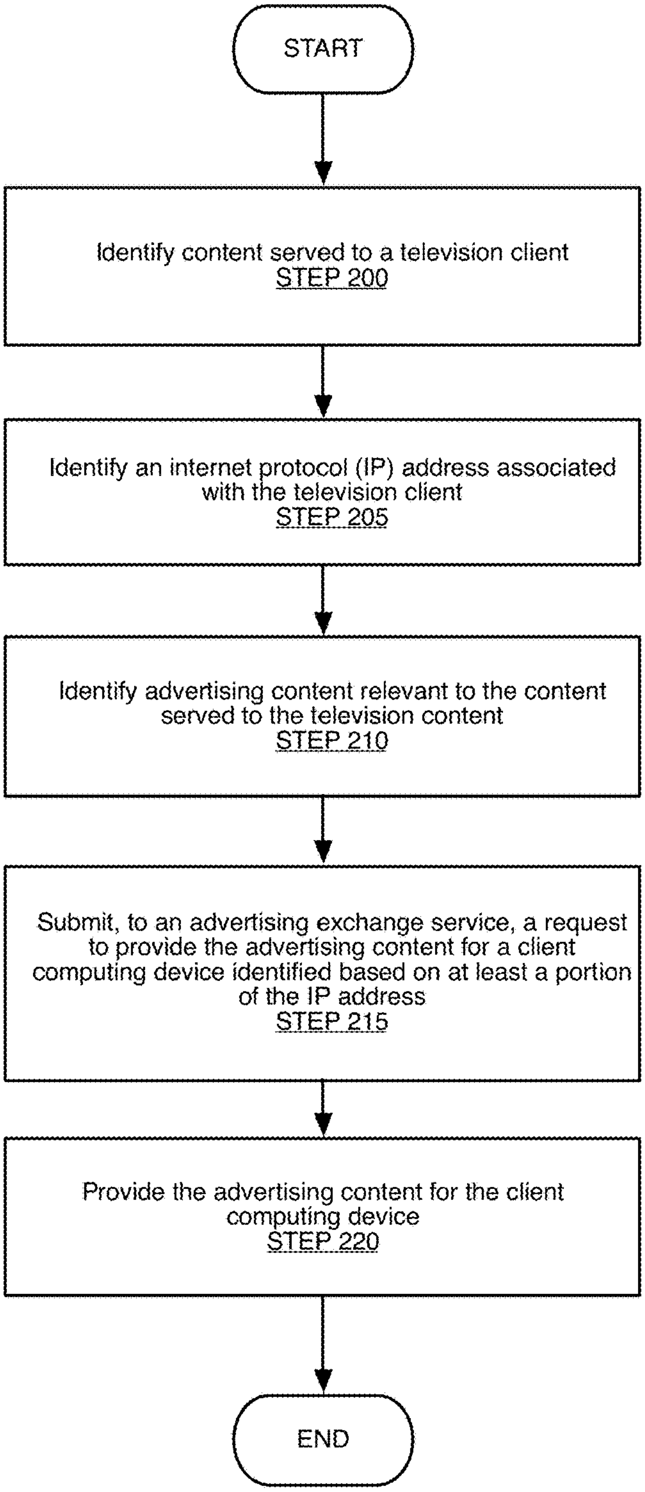
FIG. 2 depicts a flowchart of an exemplary process, in accordance with one or more embodiments of the invention.

FIG. 2 shows a flowchart of a method for providing advertising content, in accordance with one or more embodiments of the invention. While the various steps in the flowchart are presented and described sequentially, one of ordinary skill in the art will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 2 should not be construed as limiting the scope of the invention. In one or more embodiments, the steps of FIG. 2 can be performed by a client device (e.g., client (127 and 129) of FIG. 1A, discussed above).

In STEP 200, media content served to a television client is identified. The media content can be identified from a variety of sources, in accordance with various embodiments of the invention. For example, a content guide of a television network can be obtained and used to identify information about programs served to a television client. The content can be served from an external provider from the entity identifying the content (e.g., advertising engine (100) of FIG. 1A, discussed above). The content can be identified in real-time or based on a historical record of viewed content.

In STEP 205, an internet protocol (IP) address associated with the television client is identified. Identification of the IP address need not involve determining the full IP address. Identification of the IP address may involve a partial identification (e.g., in scenarios where a portion of the IP is masked/hidden due to privacy concerns) or can involve receiving an encoded identifier corresponding to the IP address. Any form of identification of the IP address can be performed, in accordance with various embodiments of the invention. For example, an advertising engine may receive a partially masked IP address from an advertising exchange service. Identification of the IP address may be performed prior to, during, or after STEP 200 and STEP 210, in accordance with various embodiments of the invention.

In STEP 210, advertising content relevant to the media content is identified. The advertising content can be matched to the media content based on a household profile of a user or group of users, or any other method of determining relevancy. For example, metadata corresponding to the broadcasted media content can be matched to a set of advertising content categories. Content from matching advertising content categories can then be selected for inclusion in a result set of relevant content.

In STEP 215, a request is submitted to an advertising exchange service. In the example of FIG. 2, the request is to provide the advertising content for a client computing device identified based on at least a portion of the IP address. In one or more embodiments, the request to provide relevant content can be submitted at any time prior to, during, or after STEPS 200-210. Also, in one or more embodiments, the advertising exchange service is not required, and the request to provide relevant content is sent to a separate component (internal or external to an advertising engine) configured to facilitate content transmission to one or more client computing devices.

In STEP 220, the advertising content is provided for the client computing device. The content can be transmitted through any number of intermediary components or systems before arriving at the client computing device. In one or more embodiments of the invention, the advertisement content can be selected and provided to the client by a remote advertising engine (100) (e.g., advertising engine (100) of FIG. 1A, discussed above). An advertising exchange service (e.g., advertising exchange service (110) of FIG. 1A, discussed above) can also be used in conjunction with the advertising engine, in order to match content and/or advertisers with one or more receiving clients.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 5:
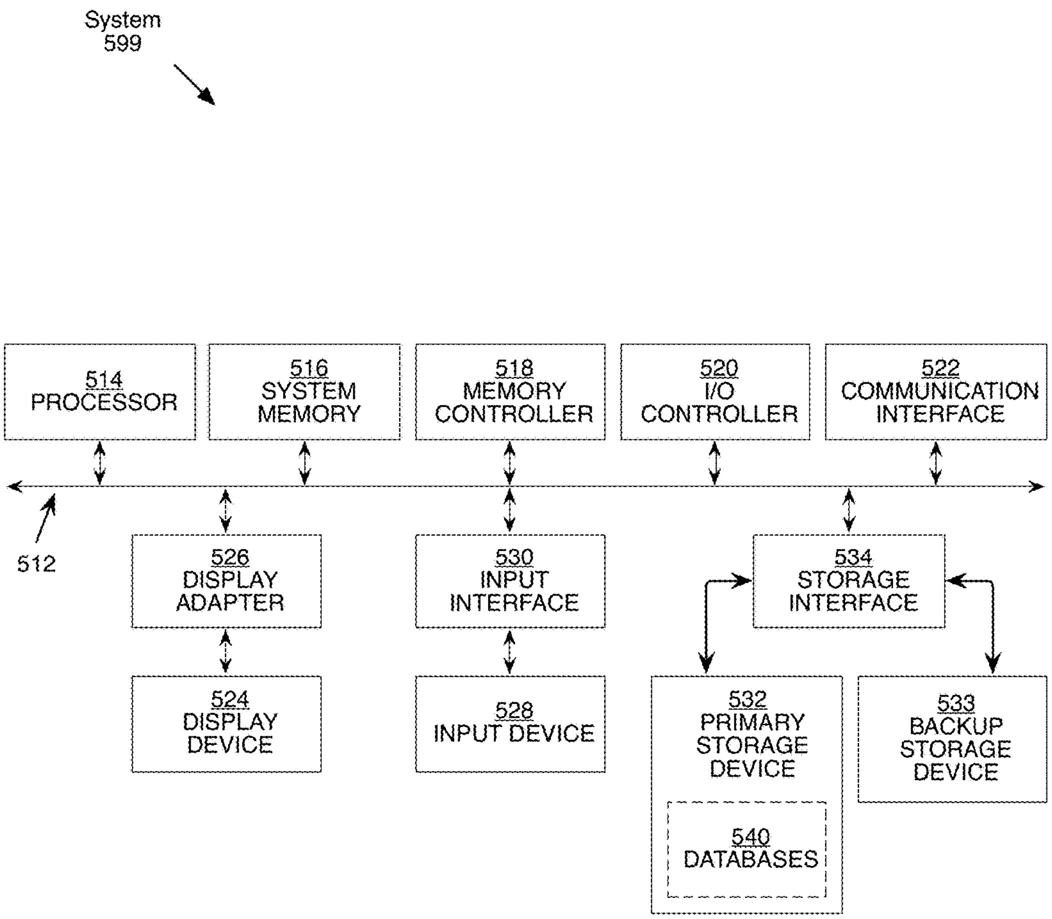
FIGS. 5 and 6 are block diagrams of exemplary computing systems, in accordance with one or more embodiments of the invention.

FIG. 5 is a block diagram of an example of a computing system 599 capable of implementing embodiments of the present disclosure. Computing system 599 broadly represents any single or multi-processor computing device or system capable of executing computer-readable instructions. Examples of computing system 599 include, without limitation, workstations, laptops, client-side terminals, servers, distributed computing systems, handheld devices, or any other computing system or device. In its most basic configuration, computing system 599 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, RAM, ROM, flash memory, or any other suitable memory device. Although not required, in certain embodiments computing system 599 may include both a volatile memory unit (such as, for example, system memory 516) and a non-volatile storage device (such as, for example, primary storage device 532).

Computing system 599 may also include one or more components or elements in addition to processor 514 and system memory 516. For example, in the embodiment of FIG. 5, computing system 599 includes a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 599. For example, memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, I/O controller 520 may control or facilitate transfer of data between one or more elements of computing system 599, such as processor 514, system memory 516, communication interface 522, display adapter 526, input interface 530, and storage interface 534.

Communication interface 522 broadly represents any type or form of communication device or adapter capable of facilitating communication between example computing system 599 and one or more additional devices. For example, communication interface 522 may facilitate communication between computing system 599 and a private or public network including additional computing systems. Examples of communication interface 522 include, without limitation, a wired network interface (such as a network interface card), a wireless network interface (such as a wireless network interface card), a modem, and any other suitable interface. In one embodiment, communication interface 522 provides a direct connection to a remote server via a direct link to a network, such as the Internet. Communication interface 522 may also indirectly provide such a connection through any other suitable connection.

Communication interface 522 may also represent a host adapter configured to facilitate communication between computing system 599 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 522 may also allow computing system 599 to engage in distributed or remote computing. For example, communication interface 522 may receive instructions from a remote device or send instructions to a remote device for execution.

As illustrated in FIG. 5, computing system 599 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data for display on display device 524.

As illustrated in FIG. 5, computing system 599 may also include at least one input device 528 coupled to communication infrastructure 512 via an input interface 530. Input device 528 generally represents any type or form of input device capable of providing input, either computer- or human-generated, to computing system 599. Examples of input device 528 include, without limitation, a keyboard, a pointing device, a speech recognition device, or any other input device.

As illustrated in FIG. 5, computing system 599 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 599.

In one example, databases 540 may be stored in primary storage device 532. Databases 540 may represent portions of a single database or computing device or it may represent multiple databases or computing devices. For example, databases 540 may represent (be stored on) a portion of computing system 599 and/or portions of example network architecture 699 in FIG. 6 (below). Alternatively, databases 540 may represent (be stored on) one or more physically separate devices capable of being accessed by a computing device, such as computing system 599 and/or portions of network architecture 699.

Continuing with reference to FIG. 5, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 599. For example, storage devices 532 and 533 may be configured to read and write software, data, or other computer-readable information. Storage devices 532 and 533 may also be a part of computing system 599 or may be separate devices accessed through other interface systems.

Many other devices or subsystems may be connected to computing system 599. Conversely, all of the components and devices illustrated in FIG. 5 need not be present to practice the embodiments described herein. The devices and subsystems referenced above may also be interconnected in different ways from that shown in FIG. 5. Computing system 599 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 599. All or a portion of the computer program stored on the computer-readable medium may then be stored in system memory 516 and/or various portions of storage devices 532 and 533. When executed by processor 514, a computer program loaded into computing system 599 may cause processor 514 to perform and/or be a means for performing the functions of the example embodiments described and/or illustrated herein. Additionally or alternatively, the example embodiments described and/or illustrated herein may be implemented in firmware and/or hardware.

For example, a computer program for requesting advertising content for display by a thin client application may be stored on the computer-readable medium and then stored in system memory 516 and/or various portions of storage devices 532 and 533. When executed by the processor 514, the computer program may cause the processor 514 to perform and/or be a means for performing the functions required for carrying out the process described with regard to the flowchart of FIG. 4 (discussed above).

Figure 6:
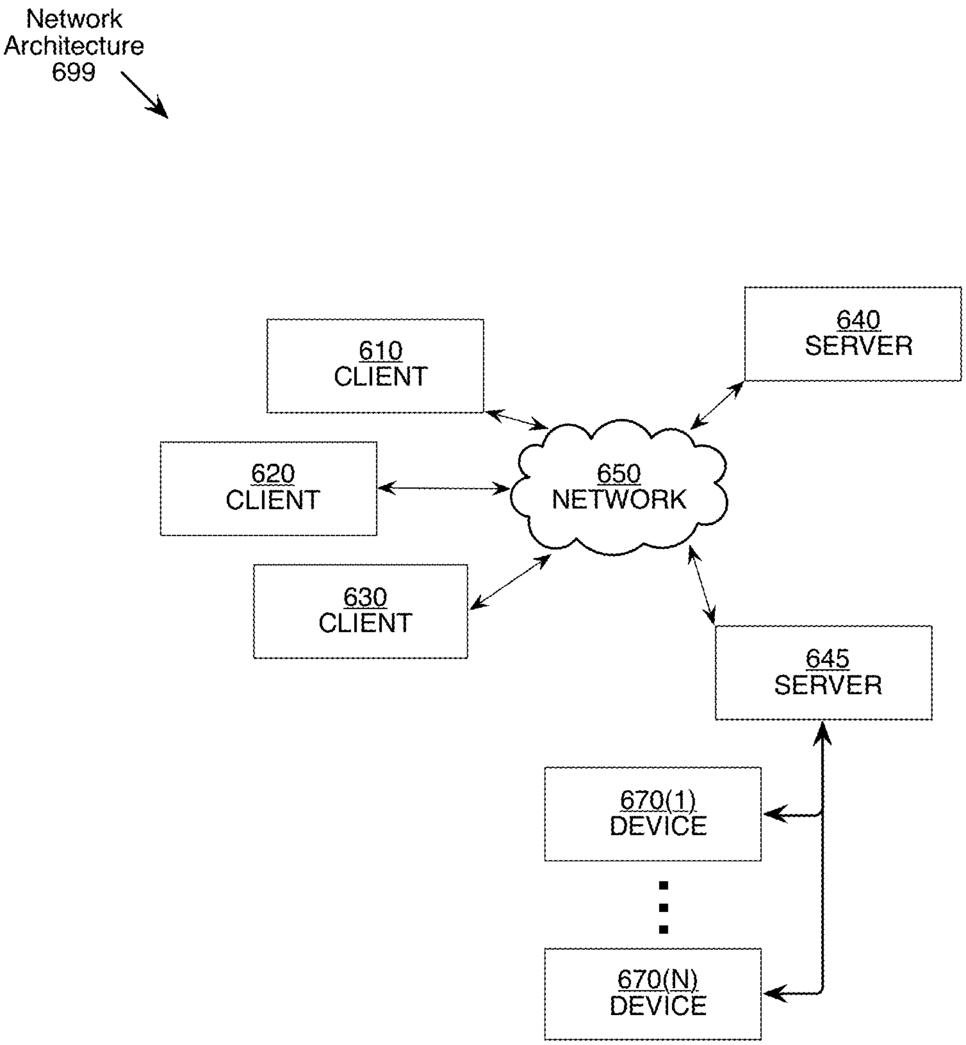

FIG. 6 is a block diagram of an example of a network architecture 699 in which client systems 610, 620, and 630 and servers 640 and 645 may be coupled to a network 650. Client systems 610, 620, and 630 generally represent any type or form of computing device or system, such as clients 127 and 129 of FIG. 1A.

Similarly, servers 640 and 645 generally represent computing devices or systems, such as application servers or database servers, configured to provide various database services and/or run certain software applications (e.g., functionality of advertising engine 100 of FIG. 1A, discussed above). Network 650 generally represents any telecommunication or computer network including, for example, an intranet, a wide area network (WAN), a local area network (LAN), a personal area network (PAN), or the Internet.

With reference to computing system 599 of FIG. 5, a communication interface, such as communication interface 522, may be used to provide connectivity between each client system 610, 620, and 630 and network 650. Client systems 610, 620, and 630 may be able to access information on server 640 or 645 using, for example, a Web browser, thin client application, or other client software. Such software may allow client systems 610, 620, and 630 to access data hosted by server 640, server 645, or storage devices 670(1)-(N). Although FIG. 6 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 640, server 645, storage devices 670(1)-(N), or any combination thereof. All or a portion of one or more of the example embodiments disclosed herein may also be encoded as a computer program, stored in server 640, run by server 645, and distributed to client systems 610, 620, and 630 over network 650.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

[0110] Fictional Markup Language Formatted Text.

[0111] <metadata><duration>20000</duration><default>0</default></metad
ata><ad_options><ad_images><image
type="sd">http://adengine.s3.server.com/ads/demo/redbull/rb_hd_ppv.jpg</image><i
mage
type="hd">http://adengine.s3.server.com/ads/demo/redbull/rb_sd_ppv.jpg</image></
ad_images><ad_duration>60</ad_duration><ad_count>1</ad_count><ads><ad
sdImg="" hdImg=""><ad_id>1320</ad_id><title>Ads by
adRise</title><impTracking><![CDATA[http://ads.adengine.tv/track/impression.php
?adid=1320&appid=demo&platform=roku&pubid=82e546bf9b5e8e3f1418426619eee
8a4&ssl=eWUjXYJxc5IwmBb3wWQJA0pta%2FqtIytktAuqDk3bM0c%3D&zid=de
mo_roku&cid=67184&deviceid=1GH31Y030966&_=8967879462521]]></impTrack
ing><clickTracking
/><contentType>Ad</contentType><contentQuality>hd</contentQuality><media><s
treamFormat>mp4</streamFormat><streamQuality>hd</streamQuality><streamBitra
te>1500</streamBitrate><streamUrl><![CDATA[http://c3.adengine.tv/ads/transcodes
/001320/000309/roku-1195k.mp4
]]></streamUrl><renditions><rendition><audio_bitrate_kbs>128</audio_bitrate_kbs
><audio_samplerate_hz>44100</audio_samplerate_hz><total_bitrate_kbs>2407</tot
al_bitrate_kbs><video_duration>60.11</video_duration><video_bitrate_kbs>2272</ video_bitrate_kbs><video_framerate_fps>29.97</video_framerate_fps><video_widt
h>1280</video_width><video_height>720</video_height><video_container>mp4</
video_container><url><![CDATA[http://c3.adengine.tv/ads/transcodes/001320/0003
09/roku-2390k.mp4
]]></url></rendition><rendition><url><![CDATA[http://c3.adengine.tv/ads/transcod
es/001320/000309/roku-1195k.mp4
]]></url></rendition><rendition><audio_bitrate_kbs>128</audio_bitrate_kbs><audi
o_samplerate_hz>44100</audio_samplerate_hz><total_bitrate_kbs>556</total_bitrat
e_kbs><video_duration>60.11</video_duration><video_bitrate_kbs>422</video_bitr
ate_kbs><video_framerate_fps>29.97</video_framerate_fps><video_width>1280</v
ideo_width><video_height>720</video_height><video_container>mp4</video_cont
ainer><url><![CDATA[http://c3.adengine.tv/ads/transcodes/001320/000309/roku-
400k.mp4 ]]></url></rendition></renditions><Duration>60</Duration><PluginID
/><TrackingEvents><Tracking_0
event="start"><![CDATA[http://ads.adengine.tv/track/view.php?adid=1320&appid=d
emo&platform=roku&pubid=82e546bf9b5e8e3f1418426619eee8a4&zid=demo_roku
&_=8967879462521&deviceid=1GH31V030966&cid=67184&pct=0]]></Tracking_0
><Tracking_25
event="firstQuartile"><![CDATA[http://ads.adengine.tv/track/view.php?adid=1320&
appid=demo&platform=roku&pubid=82e546bf9b5e8e3f1418426619eee8a4&zid=de
mo_roku&_=8967879462521&deviceid=1GH31V030966&cid=67184&pct=25]]></
Tracking_25><Tracking_50
event="midpoint"><![CDATA[http://ads.adengine.tv/track/view.php?adid=1320&app
id=demo&platform=roku&pubid=82e546bf9b5e8e3f1418426619eee8a4&zid=demo_ roku&_=8967879462521&deviceid=1GH31V030966&cid=67184&pct=50]]></Track
ing_50><Tracking_75
event="thirdQuartile"><![CDATA[http://ads.adengine.tv/track/view.php?adid=1320
&appid=demo&platform=roku&pubid=82e546bf9b5e8e3f1418426619eee8a4&zid=d
emo_roku&_=8967879462521&deviceid=1GH31V030966&cid=67184&pct=75]]></
Tracking_75><Tracking_100
event="complete"><![CDATA[http://ads.adengine.tv/track/view.php?adid=1320&app
id=demo&platform=roku&pubid=82e546bf9b5e8e3f1418426619eee8a4&zid=demo_
roku&_=8967879462521&deviceid=1GH31V030966&cid=67184&pct=100]]></Trac
king_100></TrackingEvents></media><synopsis
/><genres>Clip</genres><runtime>1260</runtime><interactivebar><option><img>
<![CDATA[
]]></img><url><![CDATA[http://ads.adengine.tv/track/ua.php?adid=1320&appid=de
mo&platform=roku&pubid=82e546bf9b5e8e3f1418426619eee8a4&zid=demo_roku
&_=8967879462521&deviceid=1GH31V030966&cid=67184&value=option_1&3rd-
tracking-url=]]></url></option><option><img><![CDATA[
]]></img><url><![CDATA[http://ads.adengine.tv/track/ua.php?adid=1320&appid=de
mo&platform=roku&pubid=82e546bf9b5e8e3f1418426619eee8a4&zid=demo_roku
&_=8967879462521&deviceid=1GH31V030966&cid=67184&value=option_2&3rd-
tracking-url=]]></url></option><option><img><![CDATA[
]]></img><url><![CDATA[http://ads.adengine.tv/track/ua.php?adid=1320&appid=de
mo&platform=roku&pubid=82e546bf9b5e8e3f1418426619eee8a4&zid=demo_roku
&_=8967879462521&deviceid=1GH31V030966&cid=67184&value=option_3&3rd-
tracking-url=]]></url></option><option><img><![CDATA[

]]></img><url><![CDATA[http://ads.adengine.tv/track/ua.php?adid=1320&appid=de
mo&platform=roku&pubid=82e546bf9b5e8e3f1418426619eee8a4&zid=demo_roku
&_=8967879462521&deviceid=1GH31V030966&cid=67184&value=option_4&3rd-
tracking-url=]]></url></option><option><img><![CDATA[
]]></img><url><![CDATA[http://ads.adengine.tv/track/ua.php?adid=1320&appid=de
mo&platform=roku&pubid=82e546bf9b5e8e3f1418426619eee8a4&zid=demo_roku
&_=8967879462521&deviceid=1GH31V030966&cid=67184&value=option_5&3rd-
tracking-url=]]></url></option><thanks><img><![CDATA[
]]></img></thanks></interactivebar></ad></ads></ad_options><ad_options><ad_im
ages><image type="sd">http://adengine.s3.server.com/ads/demo/redbull/rb_hd_non-
ppv.jpg</image><image
type="hd">http://adengine.s3.server.com/ads/demo/redbull/rb_sd_non-
ppv.jpg</image></ad_images><ad_duration>18</ad_duration><ad_count>1</ad_co
unt><ads><ad sdImg="" hdImg=""><ad_id>1311</ad_id><title>Ads by
adRise</title><impTracking><![CDATA[http://ads.adengine.tv/track/impression.php
?adid=1311&appid=demo&platform=roku&pubid=82e546bf9b5e8e3f1418426619eee
8a4&ssl=fDfVse6%2BPSd2bqLRZiuixuAsY7zwcSLQvC85QAFNHLQ%3D&zid=d
emo_roku&cid=67184&deviceid=1GH31V030966&_=3563018699642]]></impTrac
king><clickTracking
/><contentType>Ad</contentType><contentQuality>hd</contentQuality><media><s
treamFormat>mp4</streamFormat><streamQuality>hd</streamQuality><streamBitra
te>1500</streamBitrate><streamUrl><![CDATA[http://c3.adengine.tv/ads/transcodes
/001311/000302/roku-797k.mp4
]]></streamUrl><renditions><rendition><audio_bitrate_kbs>128</audio_bitrate_kbs ><audio_samplerate_hz>44100</audio_samplerate_hz><total_bitrate_kbs>782</total
_bitrate_kbs><video_duration>18.15</video_duration><video_bitrate_kbs>650</vid
eo_bitrate_kbs><video_framerate_fps>23.98</video_framerate_fps><video_width>1
280</video_width><video_height>720</video_height><video_container>mp4</vide
o_container><url><![CDATA[http://c3.adengine.tv/ads/transcodes/001311/000302/ro
ku-797k.mp4
]]></url></rendition><rendition><audio_bitrate_kbs>128</audio_bitrate_kbs><audi
o_samplerate_hz>44100</audio_samplerate_hz><total_bitrate_kbs>472</total_bitrat
e_kbs><video_duration>18.15</video_duration><video_bitrate_kbs>339</video_bitr
ate_kbs><video_framerate_fps>23.98</video_framerate_fps><video_width>1280</v
ideo_width><video_height>720</video_height><video_container>mp4</video_cont
ainer><url><![CDATA[http://c3.adengine.tv/ads/transcodes/001311/000302/roku-
400k.mp4 ]]></url></rendition></renditions><Duration>18</Duration><PluginID
/><TrackingEvents><Tracking_0
event="start"><![CDATA[http://ads.adengine.tv/track/view.php?adid=1311&appid=d
emo&platform=roku&pubid=82e546bf9b5e8e3f1418426619eee8a4&zid=demo_roku
&_=3563018699642&deviceid=1GH31V030966&cid=67184&pct=0]]></Tracking_0
><Tracking_25
event="firstQuartile"><![CDATA[http://ads.adengine.tv/track/view.php?adid=1311&
appid=demo&platform=roku&pubid=82e546bf9b5e8e3f1418426619eee8a4&zid=de
mo_roku&_=3563018699642&deviceid=1GH31V030966&cid=67184&pct=25]]></
Tracking_25><Tracking_50
event="midpoint"><![CDATA[http://ads.adengine.tv/track/view.php?adid=1311&app
id=demo&platform=roku&pubid=82e546bf9b5e8e3f1418426619eee8a4&zid=demo_ roku&\_=3563018699642&deviceid=1GH31V030966&cid=67184&pct=50]]></Tracking_50><Tracking_75 event="thirdQuartile"><![CDATA[http://ads.adengine.tv/track/view.php?adid=1311&appid=demo&platform=roku&pubid=82e546bf9b5e8e3f1418426619eee8a4&zid=demo_roku&\_=3563018699642&deviceid=1GH31V030966&cid=67184&pct=75]]></Tracking_75><Tracking_100 event="complete"><![CDATA[http://ads.adengine.tv/track/view.php?adid=1311&appid=demo&platform=roku&pubid=82e546bf9b5e8e3f1418426619eee8a4&zid=demo_roku&\_=3563018699642&deviceid=1GH31V030966&cid=67184&pct=100]]></Tracking_100></TrackingEvents></media><synopsis/><genres>Clip</genres><runtime>1260</runtime><interactivebar><option><img><![CDATA[]]></img><url><![CDATA[http://ads.adengine.tv/track/ua.php?adid=1311&appid=demo&platform=roku&pubid=82e546bf9b5e8e3f1418426619eee8a4&zid=demo_roku&\_=3563018699642&deviceid=1GH31V030966&cid=67184&value=option_1&3rd-tracking-url=]]></url></option><option><img><![CDATA[]]></img><url><![CDATA[http://ads.adengine.tv/track/ua.php?adid=1311&appid=demo&platform=roku&pubid=82e546bf9b5e8e3f1418426619eee8a4&zid=demo_roku&\_=3563018699642&deviceid=1GH31V030966&cid=67184&value=option_2&3rd-tracking-url=]]></url></option><option><img><![CDATA[]]></img><url><![CDATA[http://ads.adengine.tv/track/ua.php?adid=1311&appid=demo&platform=roku&pubid=82e546bf9b5e8e3f1418426619eee8a4&zid=demo_roku&\_=3563018699642&deviceid=1GH31V030966&cid=67184&value=option_3&3rd-tracking-url=]]></url></option><option><img><![CDATA[

]]></img><url><![CDATA[http://ads.adengine.tv/track/ua.php?adid=1311&appid=de
mo&platform=roku&pubid=82e546bf9b5e8e3f1418426619eee8a4&zid=demo_roku
&_=3563018699642&deviceid=1GH31V030966&cid=67184&value=option_4&3rd-
tracking-url=]]></url></option><option><img><![CDATA[
]]></img><url><![CDATA[http://ads.adengine.tv/track/ua.php?adid=1311&appid=de
mo&platform=roku&pubid=82e546bf9b5e8e3f1418426619eee8a4&zid=demo_roku
&_=3563018699642&deviceid=1GH31V030966&cid=67184&value=option_5&3rd-
tracking-url=]]></url></option><thanks><img><![CDATA[
]]></img></thanks></interactivebar></ad></ads>

What is claimed is:

1. A system for adaptive multi-device content distribution based on associated internet protocol (IP) addressing, the system comprising:

a computer processor;

a content engine executing on the computer processor and configured to:

identify media content served to a television client;

identify a television client internet protocol (IP) address associated with the television client, wherein the television client is linked to a household profile;

submit, to a content exchange service, a request for content placement opportunities;

receive content placement opportunities from the content exchange service, wherein one or more content placement opportunities identify at least a portion of a mobile client IP address representing a requesting mobile client device outside of a local network of the television client; and linking one or more of the requesting mobile client devices to the household profile by:

determining a percentage of requests of the requesting mobile client device originating from a common origin;

comparing the percentage to a predefined threshold; and linking the requesting mobile client device to the household profile based on determining that the threshold is exceeded; and a content provider configured to:

identify content relevant to the media content; and provide the content for the content placement opportunity to be displayed on the one or more requesting mobile client devices linked to the household profile.

2. The system of claim 1, the content engine further configured to:

provide the television client IP address to the content exchange service in conjunction with the request, wherein the content exchange service identifies content placement opportunities by matching at least a portion of the television client IP address, at least one of the content placement opportunities referencing at least one of the requesting mobile client devices connected to a common network of the television client.

3. A non-transitory computer-readable storage medium comprising a plurality of instructions for multi-device content distribution, the plurality of instructions executing on at least one computer processor to enable the computer processor to:

identify media content served to a television client;

identify a television client internet protocol (IP) address associated with the television client, wherein the television client is linked to a household profile;

submit, to a content exchange service, a request for content placement opportunities;

receive content placement opportunities from the content exchange service, wherein one or more content placement opportunities identify at least a portion of a mobile client IP address representing a requesting mobile client device outside of a local network of the television client; and linking one or more of the requesting mobile client devices to the household profile by:

determining a percentage of requests of the requesting mobile client device originating from a common origin;

comparing the percentage to a predefined threshold; and linking the requesting mobile client device to the household profile based on determining that the threshold is exceeded; and identify content relevant to the media content; and provide the content for the content placement opportunity to be displayed on the one or more requesting mobile client devices linked to the household profile.

4. The non-transitory computer-readable storage medium of claim 3, wherein each of the mobile client IP addresses is truncated by the content exchange service.

5. The non-transitory computer-readable storage medium of claim 4, wherein each of the truncated mobile client IP addresses corresponds to a geographic area, and wherein the television client IP address corresponds to a geographic location within the geographic area.

6. The non-transitory computer-readable storage medium of claim 3, the plurality of instructions further enabling the computer processor to:

provide the television client IP address to the content exchange service in conjunction with the request, wherein the content exchange service identifies content placement opportunities by matching at least a portion of the television client IP address, at least one of the content placement opportunities referencing one of the requesting mobile client devices.

7. The non-transitory computer-readable storage medium of claim 3, the plurality of instructions further enabling the computer processor to:

encode the television client IP address to generate an encoded IP address;

provide the encoded IP address to an IP matching service, wherein the content exchange service provides encoded client IP addresses to the IP matching service, and wherein the client IP matching service matches the encoded IP address to an encoded client IP address of a client computing device of the requesting mobile client devices, wherein the content placement opportunities comprise a content placement opportunity associated with the client computing device.

8. The non-transitory computer-readable storage medium of claim 3, wherein the content comprises advertisement content and the content placement opportunities are advertisement placement opportunities.

9. The non-transitory computer-readable storage medium of claim 3, wherein the television client IP address is assigned to a networking device connected to both the television client and one of the requesting mobile client devices associated with at least one of the content placement opportunities.

10. A method for adaptive multi-device content distribution based on associated internet protocol (IP) addressing, the method comprising:

identifying media content served to a television client;

identifying a television client internet protocol (IP) address associated with the television client, wherein the television client is linked to a household profile;

submitting, by a computer processor and to a content exchange service, a request for content placement opportunities;

receiving content placement opportunities from the content exchange service, wherein one or more content placement opportunities identify at least a portion of a mobile client IP address representing a requesting mobile client device outside of a local network of the television client;

linking one or more of the requesting mobile client devices to the household profile by:

determining a percentage of requests of the requesting mobile client device originating from a common origin;

comparing the percentage to a predefined threshold; and linking the requesting mobile client device to the household profile based on determining that the threshold is exceeded; and identifying content relevant to the media content; and providing the content for the content placement opportunity to be displayed on the one or more requesting mobile client devices linked to the household profile.

11. The method of claim 10, wherein the mobile client IP address of each content placement opportunity is truncated by the content exchange service.

12. The method of claim 11, wherein each of the truncated mobile client IP addresses corresponds to a geographic area, and wherein the television client IP address corresponds to a geographic location within the geographic area.

13. The method of claim 10, further comprising:

providing the television client IP address to the content exchange service in conjunction with the request, wherein the content exchange service identifies content placement opportunities by matching at least a portion of the television client IP address.

14. The method of claim 10, further comprising:

providing the television client IP address to an IP matching service, wherein the content exchange service provides encoded client IP addresses to the IP matching service, and wherein the IP matching service matches the television client IP address to an encoded client IP address of a client computing device of the requesting mobile client devices, wherein the content placement opportunities comprise a content placement opportunity associated with the client computing device.

15. The method of claim 10, wherein the television client IP address is assigned to a networking device connected to both the television client and a client computing device of the requesting mobile client devices associated with at least one of the content placement opportunities.

16. The method of claim 10, further comprising:

constructing, based at least on the media content served to the television client, a household profile corresponding to the television client IP address, the household profile identifying content preferences, wherein identifying content relevant to the media content is based at least on the household profile.

* * * * *

UNITED STATES PATENT AND TRADEMARK OFFICE

CERTIFICATE OF CORRECTION

PATENT NO. : 10,356,461 B2
APPLICATION NO. : 14/846277
DATED : July 16, 2019
INVENTOR(S) : Farhad Massoudi It is certified that error appears in the above-identified patent and that said Letters Patent is hereby corrected as shown below:

In the Claims

Column 39, Line 2, cancel the text beginning with "1. A system for adaptive..." to and ending "...linked to the household profile." in Column 39, Line 35, and insert the following claim:

--1. A system for adaptive multi-device content distribution based on associated internet protocol (IP) addressing, the system comprising:

a computer processor;

a content engine executing on the computer processor and configured to:

identify media content served to a television client;

identify a television client internet protocol (IP) address associated with the television client, wherein the television client is linked to a household profile;

submit, to a content exchange service, a request for content placement opportunities;

receive content placement opportunities from the content exchange service, wherein one or more content placement opportunities identify at least a portion of a mobile client IP address representing a requesting mobile client device outside of a local network of the television client; and link one or more of the requesting mobile client devices to the household profile by:

determining a percentage of requests of the requesting mobile client device originating from a common origin;

comparing the percentage to a predefined threshold; and linking the requesting mobile client device to the household profile based on determining that the threshold is exceeded; and a content provider configured to:

identify content relevant to the media content; and provide the content for the content placement opportunity to be displayed on the one or more requesting mobile client devices linked to the household profile.--

Column 39, Line 46, cancel the text beginning with "3. A non-transitory computer-readable..." to and ending "...linked to the household profile." in Column 40, Line 9, and insert the following claim:

Signed and Sealed this
Twenty-ninth Day of October, 2019

Andrei Iancu
*Director of the United States Patent and Trademark Office*

--3. A non-transitory computer-readable storage medium comprising a plurality of instructions for multi-device content distribution, the plurality of instructions executing on at least one computer processor to enable the computer processor to:

identify media content served to a television client;

identify a television client internet protocol (IP) address associated with the television client, wherein the television client is linked to a household profile;

submit, to a content exchange service, a request for content placement opportunities;

receive content placement opportunities from the content exchange service, wherein one or more content placement opportunities identify at least a portion of a source mobile client IP address, representing a requesting mobile client device outside of a local network of the television client; and link one or more of the requesting mobile client devices to the household profile by:

determining a percentage of requests of the requesting mobile client device originating from a common origin;

comparing the percentage to a predefined threshold; and linking the requesting mobile client device to the household profile based on determining that the threshold is exceeded, and identify content relevant to the media content; and provide the content for content placement opportunity to be displayed on the one or more requesting mobile client devices linked to the household profile.--